(No Model.)

C. PACKARD.
GUIDING ATTACHMENT FOR AGRICULTURAL IMPLEMENTS.

No. 421,885. Patented Feb. 18, 1890.

Witnesses,

Inventor,
Cyrus Packard
By Dewey
Attys

UNITED STATES PATENT OFFICE.

CYRUS PACKARD, OF FRESNO, CALIFORNIA.

GUIDING ATTACHMENT FOR AGRICULTURAL IMPLEMENTS.

SPECIFICATION forming part of Letters Patent No. 421,885, dated February 18, 1890.

Application filed June 21, 1889. Serial No. 315,116. (No model.)

*To all whom it may concern:*

Be it known that I, CYRUS PACKARD, of Fresno, Fresno county, State of California, have invented an Improvement in Guiding Attachments for Agricultural Implements; and I hereby declare the following to be a full, clear, and exact description of the same.

My invention relates generally to the class of agricultural implements, and particularly to the class of attachments to cultivators, plows, harrows, and similar implements, the object of which is to properly guide, direct, or steer them; and my invention consists in the construction and combination of devices which I shall hereinafter fully describe and claim.

Figure 1:
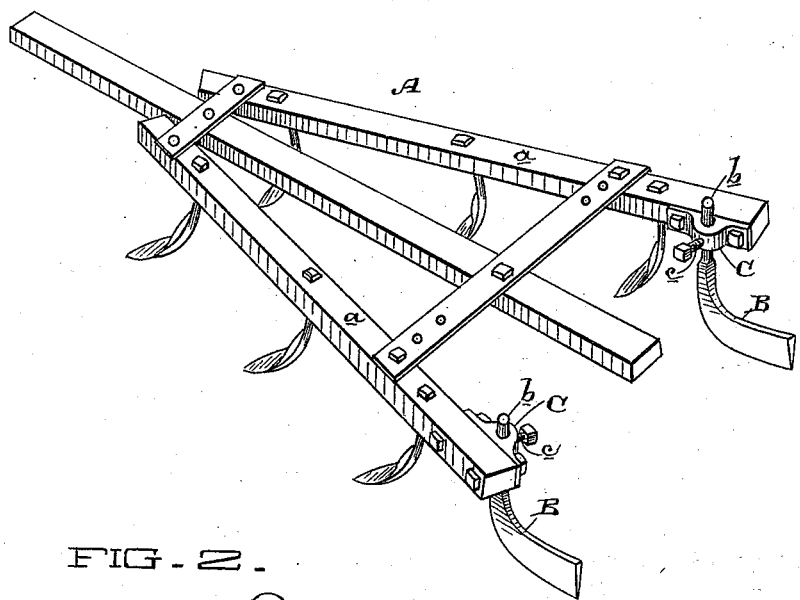
Figure 2:
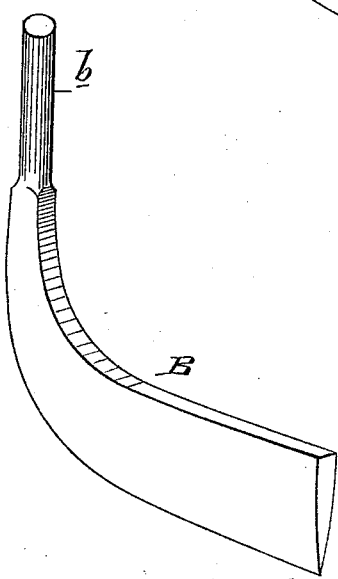

Referring to the accompanying drawings for a more complete explanation of my invention, Figure 1 is a perspective view of my guiding attachment as applied. Fig. 2 is a perspective view of the guide.

Though my attachment is applicable to other implements of this class—such as plows, harrows, &c.—I have herein shown it in connection with a cultivator A of the ordinary form.

B are the guide-arms, formed with a wide backwardly-curving body and an upwardly-extending stem portion $b$. These stems pass through bearings C, one of which is bolted to the inner side of the extreme rear end of each side bar $a$ of the cultivator, behind the rearmost teeth. These stems are held in these bearings by set-screws $c$, and the guide-arms B may be vertically adjusted to penetrate the ground to a greater or less extent, as may be required. In cases where the side bars $a$ are pivotally connected with the main frame and are adapted to be widened out or narrowed in, the guide-arms B, by being turned slightly about their stems as axes, may be adjusted properly to suit the changed position of the side bars, so that said guide-arms may be always set to direct the implement straight.

In operation the arms B enter the ground to the proper depth, according to the adjustment, and hold and guide the cultivator to the line of travel, preventing it from jumping about and injuring the trees or vines of an orchard or vineyard.

Having thus described my invention, what I claim as new, and desire to secure by Letters Patent, is—

The combination, with a frame having the side bars $a$, provided with bearings bolted to the inner side of the extreme rear end of each side bar, of guide-arms having stems fitted in said bearings and provided with backwardly-curving bodies, and set-screws for holding said stems, said guide-arms being adapted to enter the ground and hold and guide the frame steady and to the line of travel, substantially as described.

In witness whereof I have hereunto set my hand.

CYRUS PACKARD.

Witnesses:
E. D. MERRIAM,
W. E. REED.